(12) United States Patent
Johnson et al.

(10) Patent No.: US 6,383,600 B1
(45) Date of Patent: *May 7, 2002

(54) FASTENER TAPE, METHOD OF AND APPARATUS FOR MAKING FASTENER TAPE, METHOD OF USING FASTENER TAPE, AND RECLOSABLE BAG UTILIZING FASTENER TAPE

(75) Inventors: James Johnson, Duluth; Daniel T. Sullivan, Jr., Lilburn, both of GA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/365,933

(22) Filed: Aug. 2, 1999

Related U.S. Application Data

(63) Continuation-in-part of application No. 09/140,565, filed on Aug. 27, 1998, now Pat. No. 6,110,586.
(51) Int. Cl.$^7$ .............................................. B32B 27/08
(52) U.S. Cl. ........................ 428/99; 206/813; 383/61; 383/63; 383/65; 383/210; 383/211; 428/35.4; 428/101; 428/120; 428/124; 428/192; 428/194
(58) Field of Search ........................ 428/99, 101, 124, 428/192, 194, 120, 35.4; 383/61, 63, 65, 210, 211; 206/813

(56) References Cited

U.S. PATENT DOCUMENTS 5,186,543 A * 2/1993 Cochran ..................... 383/203

* cited by examiner

*Primary Examiner*—Nasser Ahmad
(74) *Attorney, Agent, or Firm*—Pitney, Hardin, Kipp & Szuch LLP

(57) ABSTRACT

A fastener tape for use in the manufacture of reclosable plastic bags is provided. The fastener tape comprises an intermediate layer and a reclosable fastener profile thereon. The intermediate layer includes three layers of co-extruded plastic, with not more than 4% EVA as the outer two layers and HDPE as the middle layer. The intermediate layer is folded so as to bring portions of the intermediate layer into an opposing relationship. These opposing portions are then sealed together by a pair of seal bars. By carefully controlling the sealing temperature, a consistent peel seal is created between the opposing portions of the intermediate layer without the need for an adhesive.

8 Claims, 11 Drawing Sheets

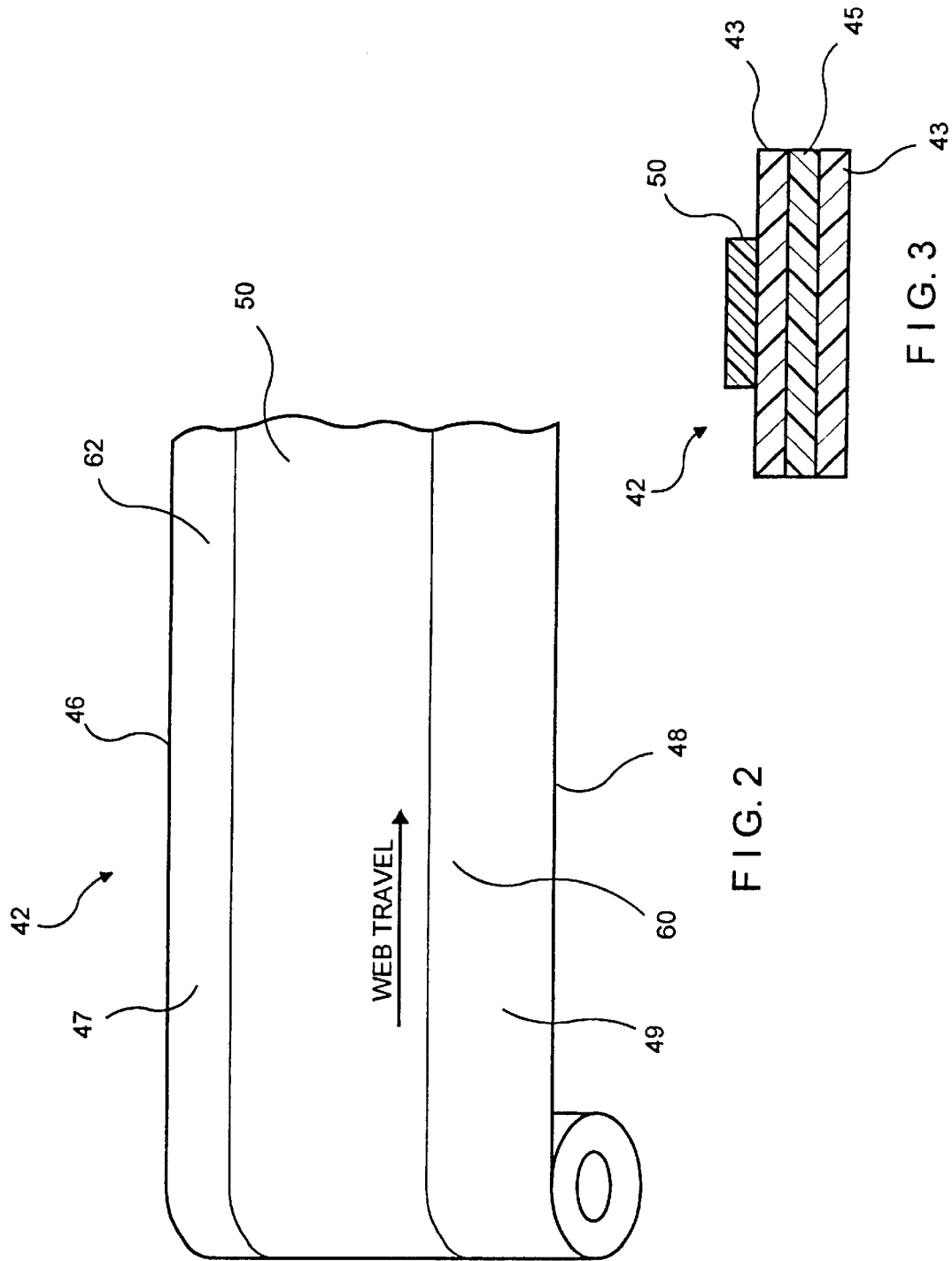

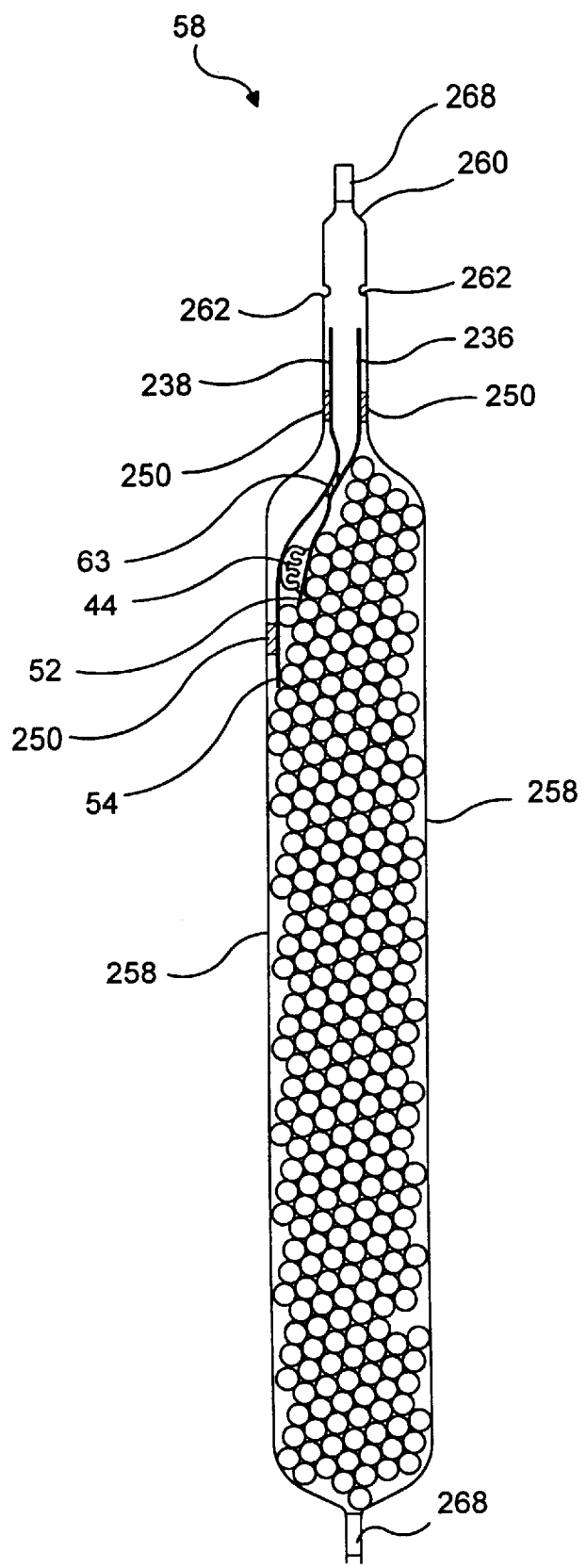
F I G. 14

FASTENER TAPE, METHOD OF AND APPARATUS FOR MAKING FASTENER TAPE, METHOD OF USING FASTENER TAPE, AND RECLOSABLE BAG UTILIZING FASTENER TAPE

CROSS-REFERENCE TO RELATED APPLICATIONS

This is a continuation-in-part (CIP) of U.S. patent application Ser. No. 09/140,565, filed Aug. 27, 1998, now U.S. Pat. No. 6,110,586 the disclosure of which is incorporated herein by reference.

BACKGROUND OF THE INVENTION

1. Field of the Invention

The present invention relates to reclosable plastic bags. This invention more particularly pertains to a fastener tape having reclosable fasteners thereon and adapted to be mounted in an opening of a reclosable bag.

2. Description of the Prior Art

Reclosable plastic bags having interlocking pressure-sealable profile fasteners are well known and have a variety of useful applications, such as the storage of household goods. The recent increase in consumer demand for reclosable bags has been coupled with a demand for higher quality profile fasteners in these bags. To meet these demands, manufacturers must develop cost effective and reliable methods of producing reclosable bags that are suitable for a consumer's particular purpose.

Consumers prefer reclosable bags in which the reclosable opening is across the top of the bag. Until recently, however, most reclosable plastic bags were manufactured with the reclosable opening located along a vertical side of the bag, rather than across the top of the bag. Simply, it was easier for manufacturers using conventional equipment and processes to attach fasteners along the side of the bag than it was to attach fasteners across the top of the bag. Recent advances in manufacturing equipment and materials have allowed some manufacturers to produce reclosable bags with the reclosable openers across the top of the bag. For example, such equipment is available from AMI/Rec-Pro, Inc. in Atlanta, Ga., USA.

Typically, most commercially available reclosable plastic bags are formed of thermoplastic, such as polyethylene. An opening in the plastic bag is equipped with a plastic profile fastener which allows the plastic bag to be opened and resealed when accessing the contents of the plastic bag. These profiles include a male profile and a female profile configured to interlock and form a continuous closure when aligned and pressed together. Interlocked male and female profiles are commonly referred to, in the singular sense, as a profile fastener, zipper profile, or merely as a profile.

There is one type of extrusion process used to extrude materials for use at the top of a bag that is known as a flange zipper process. In such a process, the profile is extruded to form flanged portions, extending from the profile fastener. However, there are problems in sealing extruded, flanged profile directly to the walls of the plastic bag (referred to as the bag walls) due to the thickness of the flanged portions. Specifically, extruded, flanged profile has a limitation as to how thin the flanges can be integrally extruded. The extrusion process results in a flanged area having a thickness significantly greater than if a similar type profile was separately manufactured and attached to a separately manufactured intermediate layer.

As an alternative to attaching flange zipper profiles directly to the bag walls, the profile may only be attached to an intermediate layer of film. The intermediate layer with the attached profile is then attached to the bag walls. The combination of the profile and the intermediate layer is commonly referred to as "fastener tape." The fastener tape and bag walls are suitably interconnected by generally known means, such as heat sealing, wherein the intermediate layer is sealed to the walls of the base material. The use of an intermediate layer permits the use of profiles that are made of a different material than the plastic bag walls. These different materials may be thermally incompatible. It is desirable to produce an intermediate layer in the thinnest manner possible in order to minimize the amount of heat necessary to attach the intermediate layer to the plastic bag. The intermediate layer is more effectively attached to a plastic bag with a minimal amount of heat, when the intermediate layer is in its thinnest form.

Excess heat in the manufacture of reclosable plastic bags promulgates defects. For example, if the intermediate layer or the profile comes into contact with excessive heat, the seal between the walls of the plastic bag and the intermediate layer may become damaged or the profile may become deformed. Such damage may be identified by an inoperable profile, wrinkles or creases in the walls of the plastic bag, or curls at the edges of the bag near the profile. Heat sealing is even more difficult when the walls of the bag are something other than polyethylene, for example polypropylene.

When manufacturing reclosable plastic bags with fastener tape, it is often desirable to include a peel seal between opposing portions of the intermediate layer. Such a peel seal assures that the integrity of the bag will be maintained until it is initially opened by the consumer by providing a hermetic seal.

In practice, however, it is has proven problematic to cost-effectively and consistently manufacture fastener tape with a peel seal. Typically in prior art fastener tapes, portions of the intermediate layer are coated with an adhesive. The intermediate layer is then folded so as to bring the adhesive bearing portions into an opposing relationship, after which the adhesive bearing portions are sealed together to form a peel seal. This method, however, is extremely complex and requires exacting control to ensure that the process is kept within acceptable parameters. Additionally, the adhesive tends to hold the ends of the fastener tape together, making the bag difficult to open. Further, it is often difficult to apply the adhesive and the adhesive can be very expensive.

In response to the realized inadequacies of known fastener tapes, it became clear that there is a need for a new type of fastener tape which facilitates the implementation of a peel seal.

SUMMARY OF THE INVENTION

Accordingly, an object of the present invention is to provide an improved fastener tape which facilitates the implementation of a peel seal.

Another object of the present invention is to provide a method of and apparatus for manufacturing the improved fastener tape.

Another object of the present invention is to provide a new method of using the improved fastener tape in the manufacture of reclosable plastic bags.

Yet another object of the present invention is to provide a new type of reclosable plastic bag which utilizes the improved fastener tape.

The foregoing objects are achieved by providing a fastener tape having an intermediate layer designed to enable the creation of a consistent peel seal.

In accordance with the present invention, the fastener tape includes an intermediate layer and a reclosable fastener profile thereon having a male profile interlockable with a female profile. The intermediate layer includes three layers of co-extruded plastic in the following configuration: not more than 4% EVA as the outer two layers and HDPE as the middle layer. The intermediate layer is folded so as to bring portions of the intermediate layer into an opposing relationship. These opposing portions are then sealed together by a pair of seal bars. By carefully controlling the sealing temperature, a consistent peel seal is created between the opposing portions of the intermediate layer.

The fastener tape is created through the use of delivery and applicator assemblies. The delivery assembly includes a plurality of rollers configured for delivering the intermediate layer to the applicator assembly. The tension of the intermediate layer between the rollers is controlled by a motorized drive roller. At least one of the plurality of rollers is fixed to the distal end of a pivoting arm. The proximal end of the arm is attached to an axis which passes through the delivery assembly to a cam. As the tension of the intermediate layer in the rollers increases and decreases, the arm and cam rotate. The rotation of the cam is detected and a signal is sent to the motorized roller to change the rate of speed of the intermediate layer through the rollers.

Also on the delivery assembly is a generally V-shaped panel member for folding the intermediate layer. The intermediate layer passes over a declined surface of the V-shaped panel member and over an apex to define a fold line in the intermediate layer. Before the folded intermediate layer is received by the applicator assembly, the profile fastener is inserted into the folded intermediate layer and oriented parallel to the machine direction of the intermediate layer. On the applicator assembly are a plurality of wheels having circumferential grooves sized for receiving the profile, and a pair of rotating belts. The wheels align the profile with the intermediate layer as the intermediate layer and profile are directed into two pairs of opposed sealing bars by the belts to form the fastener tape. The sealing bars of each set are moveable with respect to one another from a spaced clearance position into a clamping and sealing position. In the clamping and sealing position, the first set of sealing bars seal the profile to the intermediate layer and the second set of sealing bars seal opposing portions of the folded intermediate layer to one another to form a peel seal. In order to achieve the peel seal, the sealing temperature is carefully controlled by blowing ambient air from a manifold above the applicator assembly, bringing the belt temperature down from approximately 180° F. to a narrow window of 85 to 100° F.

After manufacture, the fastener tape may be used to make reclosable plastic bags. Generally speaking, when making plastic bags having reclosable zipper profiles, it is necessary to seal, or stomp, the ends of the profile to ensure that the ends of the profile do not come apart during use by the consumer. Such sealing or stomping, however, often requires expensive and complex modifications to the bag making machinery.

In accordance with the present invention, the lengths of fastener tape used in the manufacture of reclosable plastic bags may advantageously be provided with seals at their ends immediately above the profile which merge into the peel seal and which seal opposing portions of the intermediate layer to each other in a permanent fashion. These end seals, referred to as block seals, eliminate the need to stomp the ends of the zipper.

These block seals may be pre-applied to the fastener tape or may be applied during sealing of the fastener tape to the reclosable bag. In the latter case the block seals also seal the side folds of the plastic bag.

The foregoing has broadly outlined some of the more pertinent objects and features of the present invention. These should be considered to be merely illustrative of some of the more prominent features and applications of the intended invention. Many other beneficial results can be obtained by applying the disclosed invention in a different manner or by modifying the disclosed embodiments. Accordingly, other objects and a more comprehensive understanding of the invention may be obtained by referring to the detailed description of the preferred embodiment taken in conjunction with the accompanying drawings, in addition to the scope of the invention defined by the claims.

BRIEF DESCRIPTION OF THE DRAWINGS

FIG. 2 is a front perspective view of a continuous roll of intermediate layer in accordance with the present invention.

FIG. 3 is a cross-sectional view of the intermediate layer.

FIG. 14 is a cross-sectional view of the reclosable plastic bag of FIG. 13.

DETAILED DESCRIPTION OF THE PREFERRED EMBODIMENT

Figure 1:
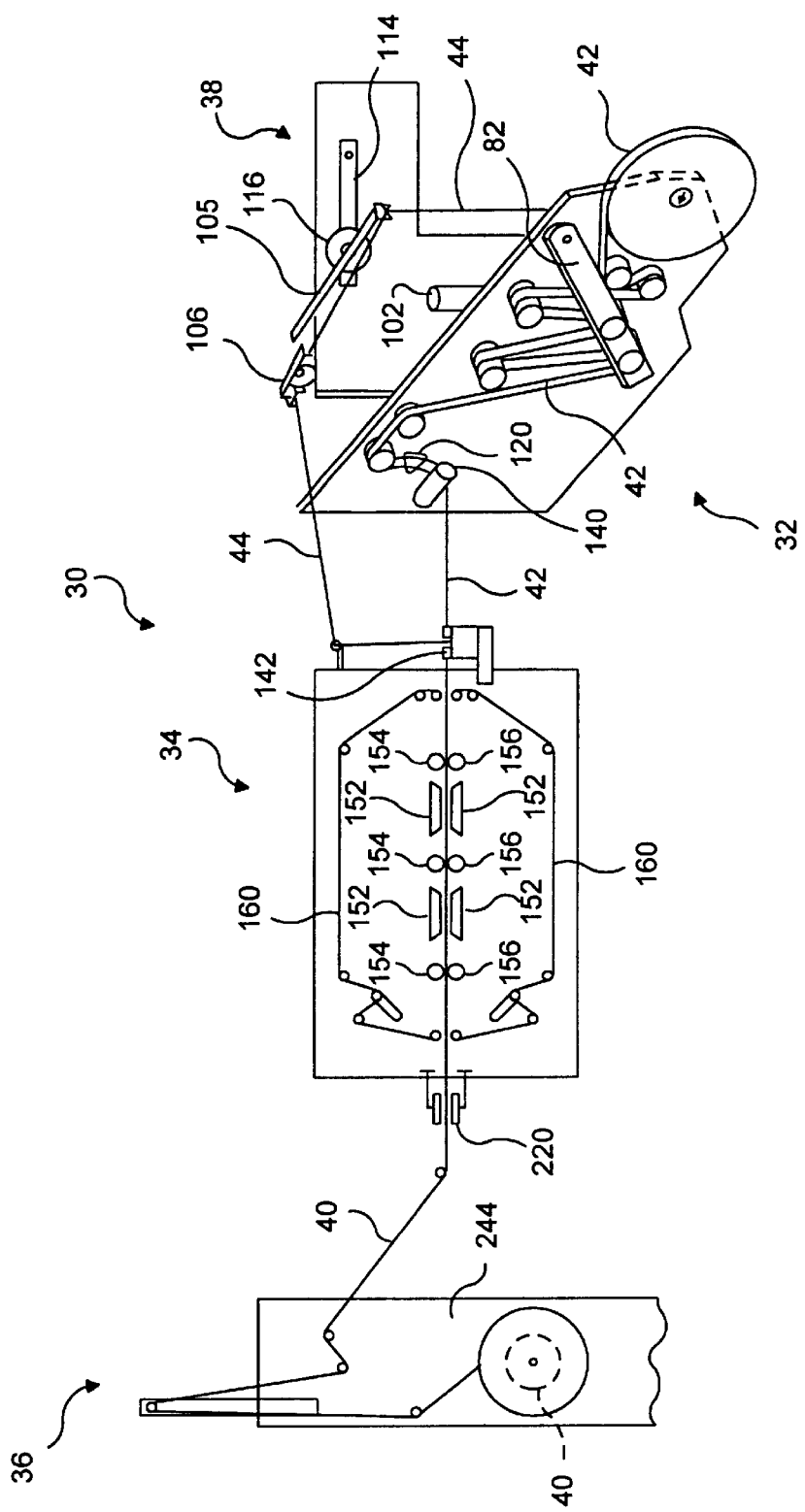
FIG. 1 illustrates the fastener tape fabrication equipment in accordance with the present invention.
Figure 8:
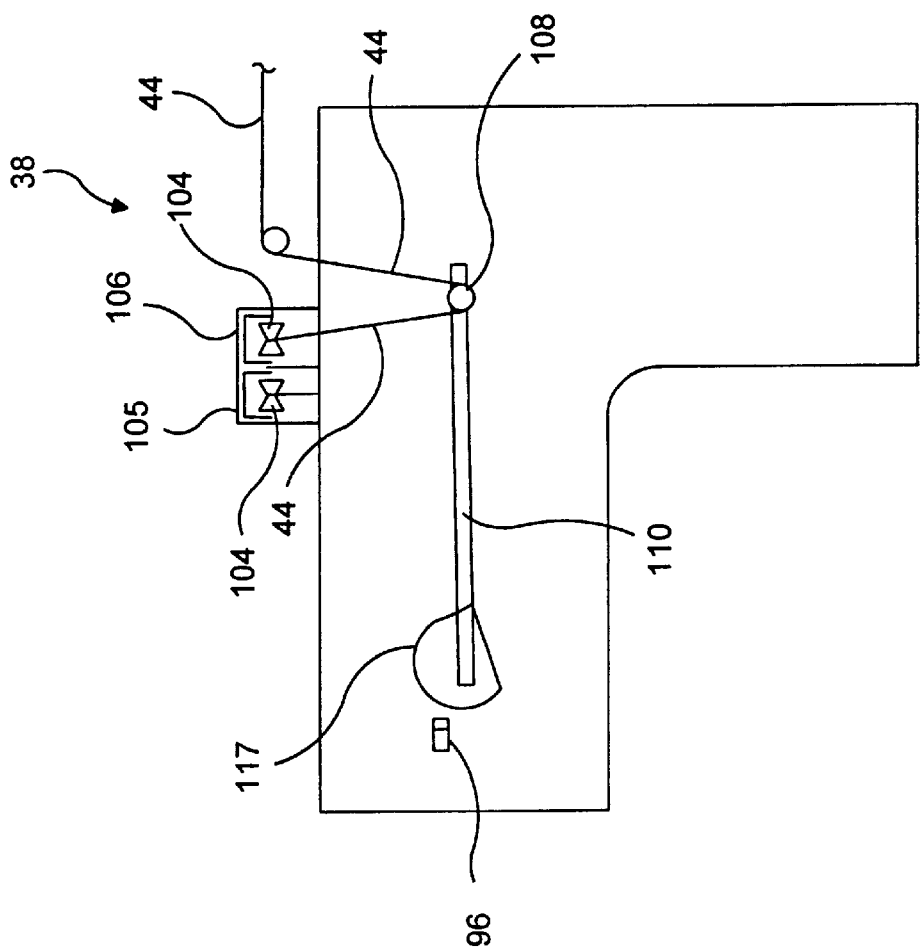
FIG. 8 shows the back side view of the profile unwind assembly shown in FIGS. 6 and 7.
Figure 9:
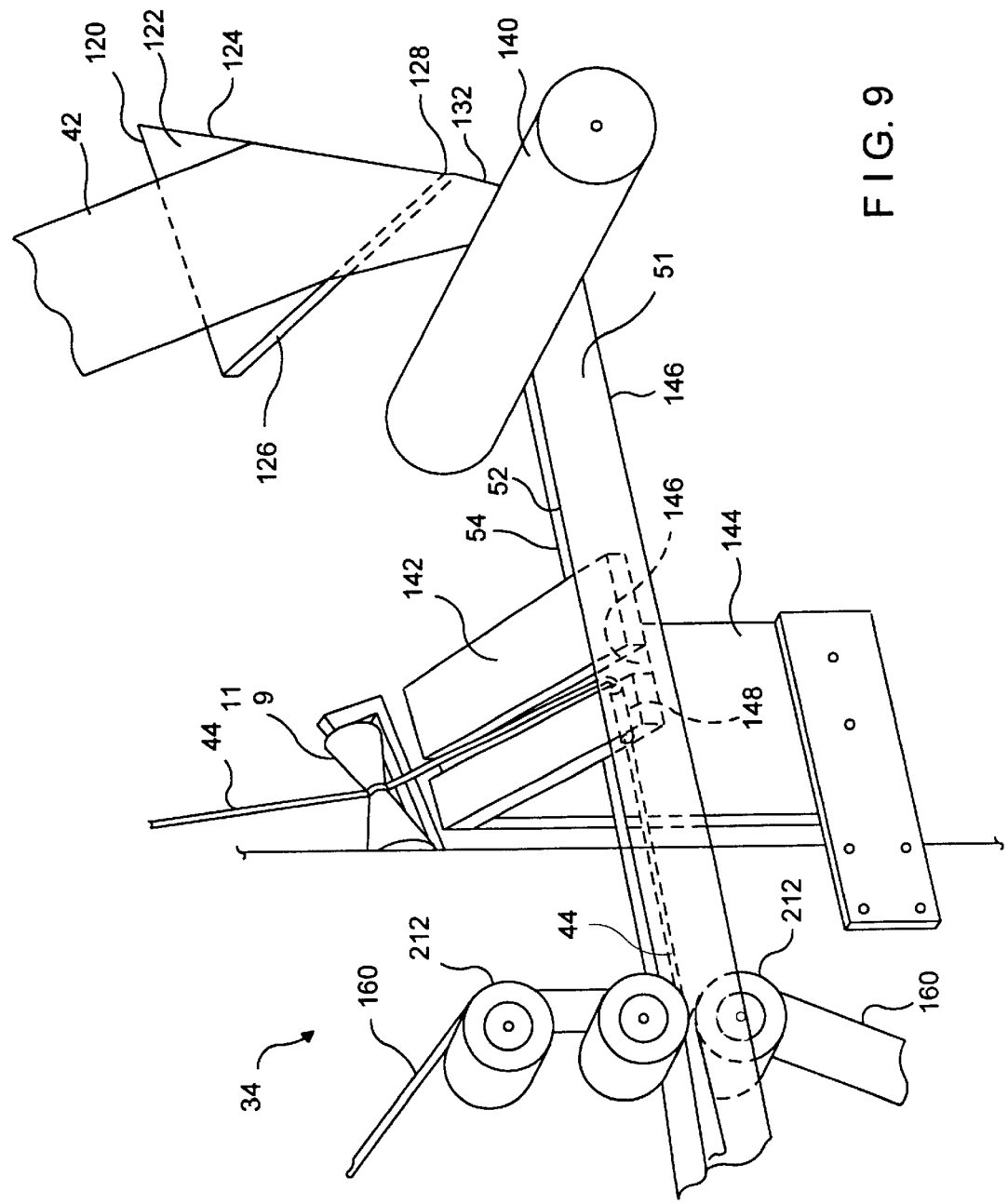
FIG. 9 illustrates a generally V-shaped panel member and a guide roller for folding the intermediate layer, and a guide for positioning the profile in the folded intermediate layer.
Figure 12:
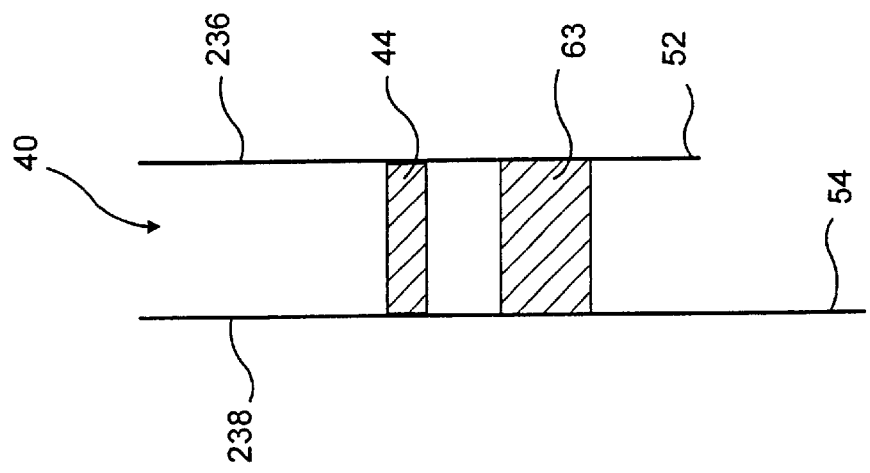
FIG. 12 is a cross-sectional view of a second embodiment of a fastener tape formed in accordance with the present invention.
Figure 13:
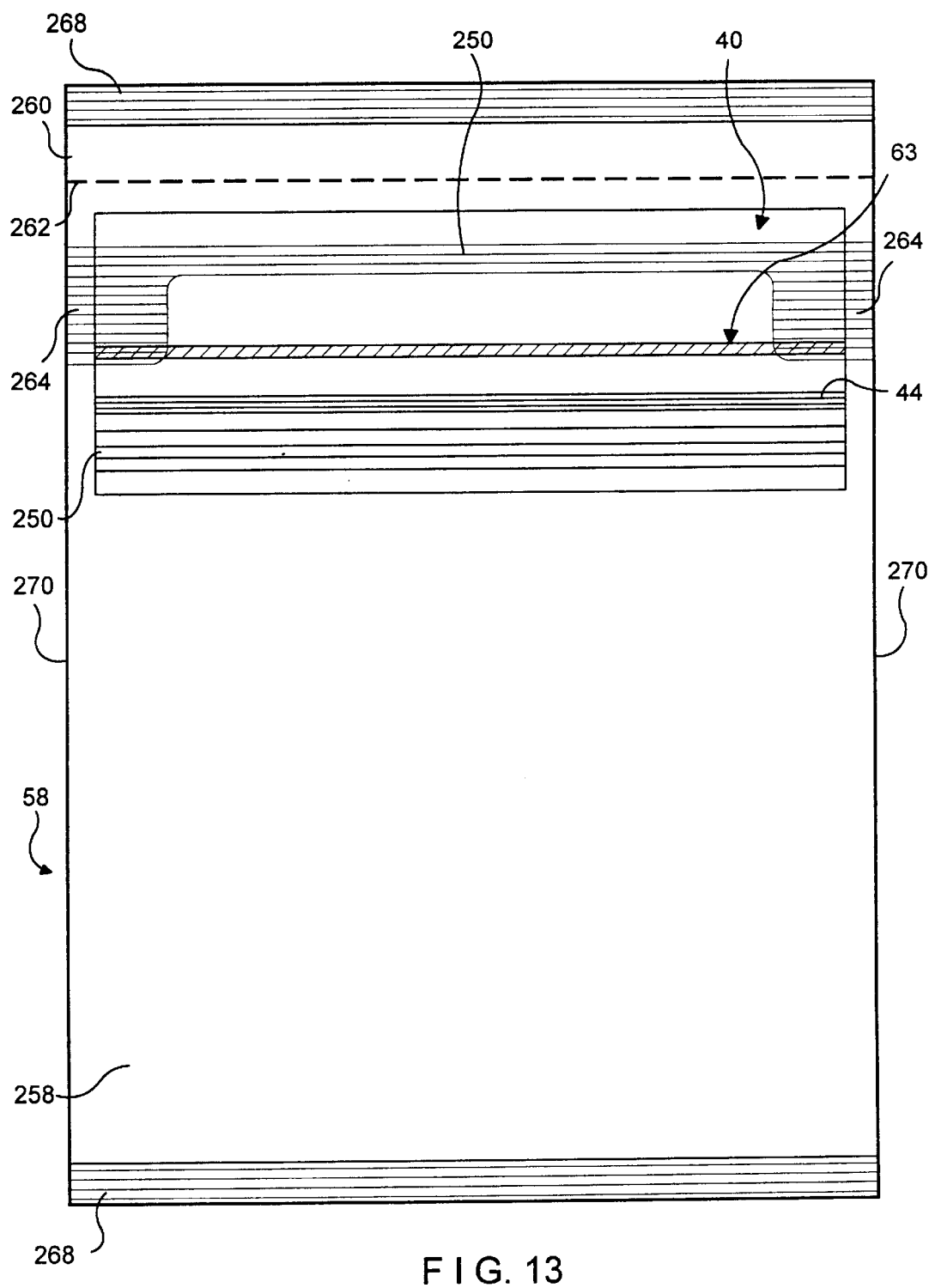
FIG. 13 is a front view of a reclosable plastic bag utilizing the fastener tape of FIG. 11.

Referring now to the drawings in which like numerals indicate like elements throughout the several views, FIG. 1 depicts fastener tape fabrication equipment in accordance with the present invention, generally designated as 30, comprising a delivery assembly 32, an applicator assembly 34, a tape collection assembly 36 and a profile unwind assembly 38. The delivery assembly 32 is illustrated in greater detail in FIGS. 4 and 5 and the profile unwind assembly 38 is illustrated in greater detail in FIGS. 6–8. FIG. 9 illustrates features of the delivery assembly 32 and the transition to the applicator assembly 34. The applicator assembly 34 is illustrated in greater detail in FIG. 10. FIGS. 2, 3, 11 and 12 are detailed illustrations of the intermediate layer 42 and the fastener tape 40. FIGS. 13 and 14 are front and cross-sectional views of a reclosable plastic bag in accordance with the present invention.

For fastener tape 40 to be fabricated in an efficient and economical manner, the delivery assembly 32 and applicator assembly 34 should be in close proximity with one another and oriented in a manner to easily configure a continuous strip of intermediate layer 42 for receiving a continuous strip of interlocking zipper profile fastener 44. As best shown in FIG. 1, the assemblies 32 and 34 should be oriented at substantially a right angle to one another to facilitate folding of the intermediate layer (FIG. 9). The manner in which the intermediate layer 42 is to be folded is described in greater detail below. The delivery assembly 32 provides the folded intermediate layer 42 with a balanced tension to the applicator assembly 34. The intermediate layer 42 then continuously advances through the applicator assembly 34. The profile unwind assembly 38 should also be oriented at substantially a right angle to the delivery assembly 32 as best shown in FIG. 1. The profile unwind assembly 38 provides the profile fastener 44 with a balanced tension to the applicator assembly 34 as described in greater detail below.

In general, the continuous strip of profile 44 is provided to the applicator assembly 34 by inserting the profile 44 in the fold of the intermediate layer 42. The applicator assembly 34 seals the profile 44 to the intermediate layer 42 to form the fastener tape 40, which is described in greater detail below, and discharges the fastener tape 40 from the applicator assembly 34 to be collected by the tape collection assembly 36. The collection assembly 36 is aligned with the machine direction of the fastener tape 40 exiting applicator assembly 34. The fastener tape 40 is wound-up by the collection assembly 36.

FIG. 2 illustrates a roll of intermediate layer 42 in accordance with the present invention. For the purposes of describing the present invention, the term "continuous" means a roll of intermediate layer or zipper profile fastener, when used by the fabrication equipment 30 of the present invention, that allows such equipment to operate substantially continuously by replacing an expended roll with another roll of like material without substantially interrupting operations.

The intermediate layer 42 is formed of three layers of co-extruded plastic, as shown in FIG. 3. The upper and lower layers 43 are formed of not more than, and preferably, 4% ethyl vinyl acetate (EVA), while the middle layer 45 is formed of high density polyethylene (HDPE). Experimentation has shown that when an intermediate layer of this configuration is used there is a narrow heat window that will produce a consistent peel seal without the need for an adhesive, as discussed further below.

The intermediate layer 42 is preferably a very thin, flexible, substantially flat web material of about 0.003 inches in thickness. It is also possible to use an intermediate layer as thin as 0.001 inches in thickness. The profile 44 is made of any known material in the industry and is of a known configuration which is suitable for attachment to the intermediate layer.

As shown in FIG. 2, the intermediate layer 42 comprises opposite longitudinal edges 46 and 48, opposite upper and lower exterior surfaces 47, 49, and a non-sealable barrier 50 coextensive with the intermediate layer 42. The non-sealable barrier 50 is located slightly off-center on one of the exterior surfaces of the intermediate layer 42 and is laterally spaced from the edges 46, 48. The intermediate layer 42 is preferably treated with a printed food grade nitrocellulose coating to form the non-sealable barrier 50. The intermediate layer 42 also includes portions 60, 62 which are not coated and which will be sealed together to form a peel seal, as discussed below.

Figure 11:
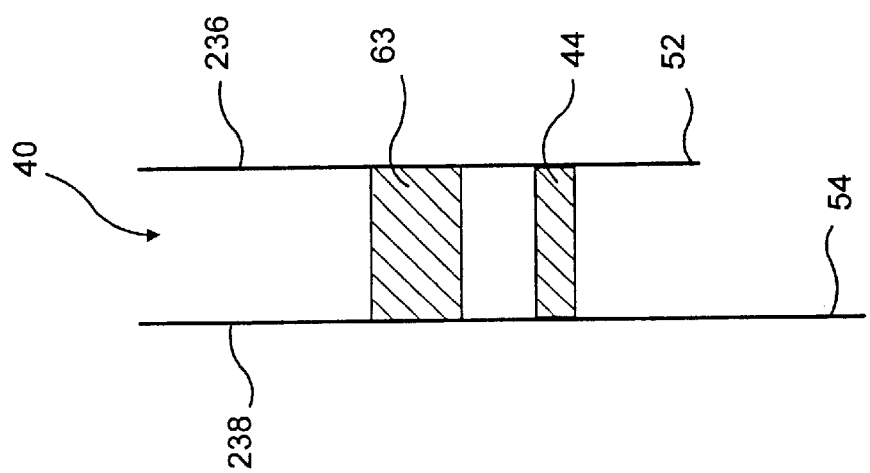
FIG. 11 is a cross-sectional view of a first embodiment of a fastener tape formed in accordance with the present invention.

The positioning of the non-sealable barrier 50 is dependent upon where the intermediate layer 42 will be folded. The intermediate layer 42 is folded lengthwise down the center of non-sealable barrier 50 to form a fold 51 (FIG. 9) and upper and lower flanges 52 and 54 respectively (FIGS. 9, 11 and 12). It is preferable that flanges 52 and 54 be of unequal widths as will become apparent when sealing the fastener tape 40 to a reclosable plastic bag 58 (FIGS. 13 and 14). Flanges 52, 54 of unequal width are formed by offsetting the barrier 50 on the intermediate layer 42 and folding the intermediate layer 42 down the center of the barrier 50, rather than the center of the intermediate layer 42 itself.

When the intermediate layer 42 is thus folded, the portions 60, 62 of the intermediate layer which do not contain the non-sealable coating 50 are brought into an opposing relationship. When these opposing portions 60, 62 are sealed together, as discussed in further detail below, a peel seal is created.

Figure 4:
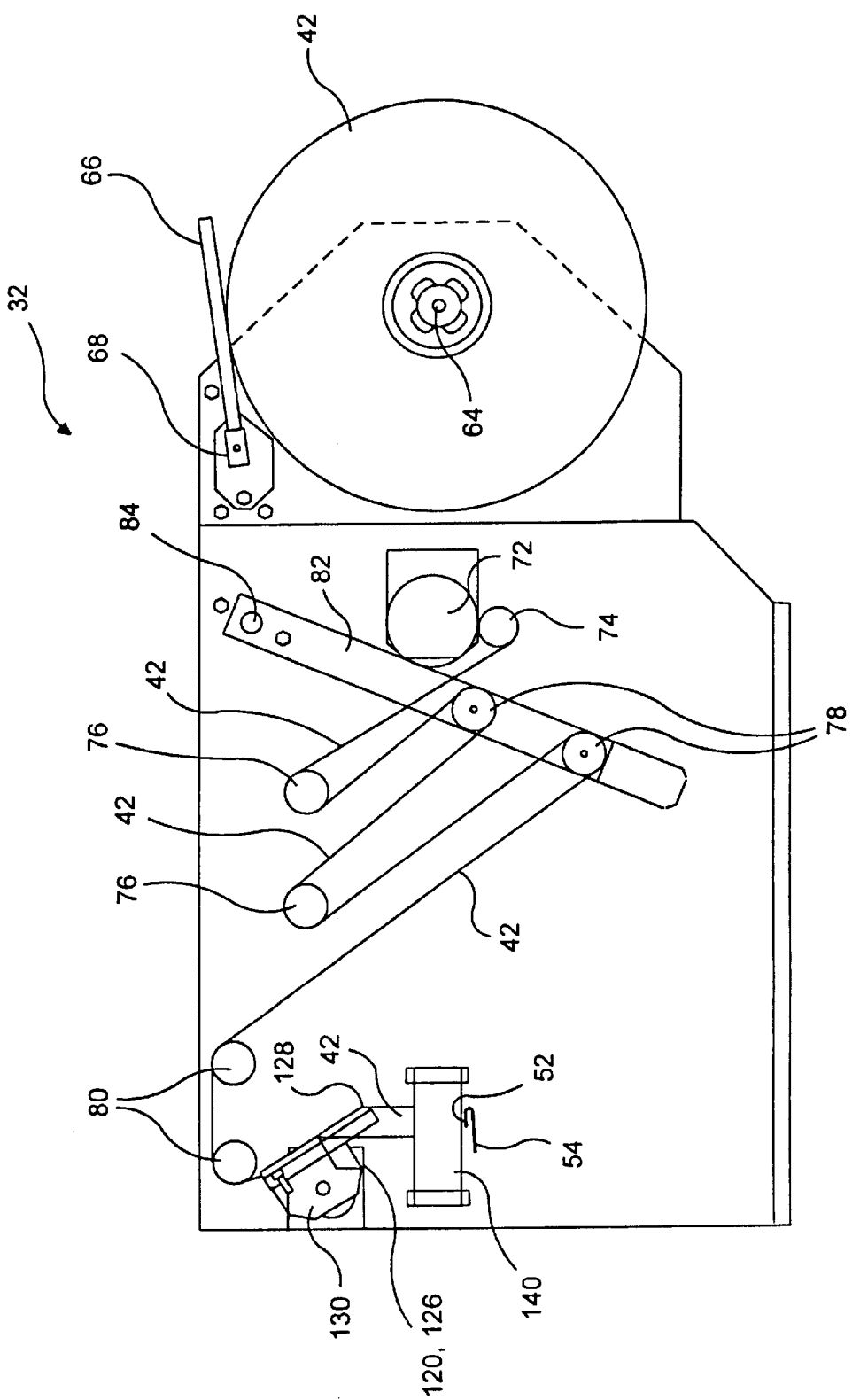
FIG. 4 is a front side view of a plurality of dancer rolls, a pivoting arm and a drive roller to balance the tension of the intermediate layer in FIG. 2 as the intermediate layer is unwound.
Figure 5:
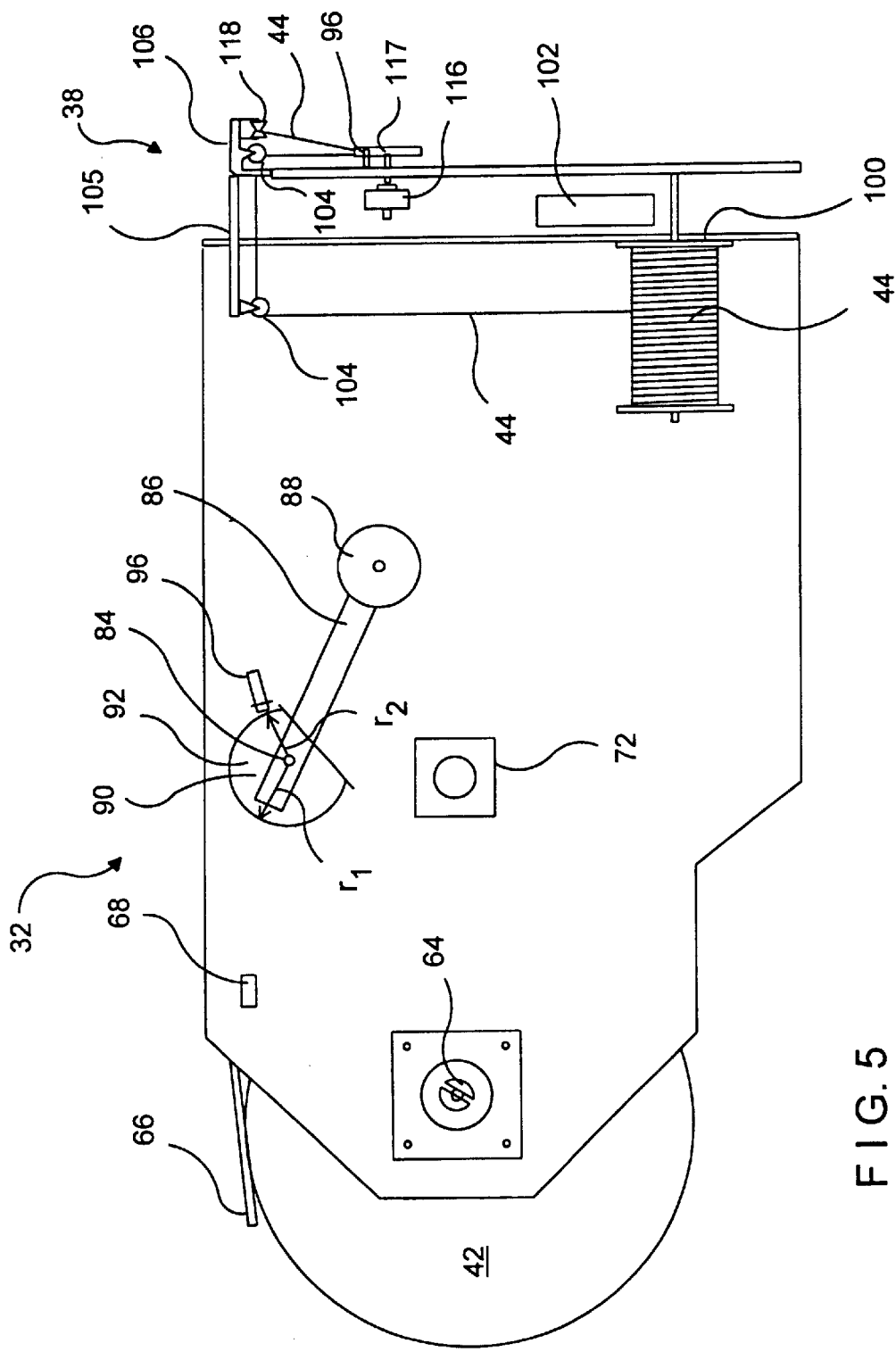
FIG. 5 is a back side view of FIG. 4 illustrating a roll of profile fastener being dispensed and a cam opposite the pivoting arm and rollers in FIG. 4.

FIGS. 4 and 5 illustrate the front and back side views, respectively, of the delivery assembly 32. The intermediate layer 42 is provided on an unwind roll 64. The roll 64 of intermediate layer 42 is rotatably mounted at one end of the delivery assembly 32 and provides the intermediate layer to the delivery assembly 32 at a rate of approximately 75 to 85 feet per minute. Preferably, the intermediate layer is delivered at approximately 80 feet per minute.

The unwind roll is laterally adjustable in relation to the direction of the intermediate layer 42 being unwound from the roll 64. The roll 64 includes an alignment mechanism that has a screw adjustment which adjusts the position of the intermediate layer 42 on the delivery assembly 12. A sensing rod 66 and a sensing rod mount 68 are mounted to the delivery assembly 32 to contact the outer periphery of the roll of intermediate layer 42. The sensing rod 66 is used to determine the amount of intermediate layer 42 remaining on the roll by measuring the radius of the roll of inter-mediate layer 42 as the intermediate layer is being dispensed.

The delivery assembly 32 further comprises a delivery system for delivering the intermediate layer 42 to the applicator assembly 34. The delivery system comprises a motorized drive roller 72 and a plurality of dancer rollers 76, 78, and 80 as described below. The intermediate layer 42 is fed into the motorized drive roller 72 which is fixed about a rotational axis to the delivery assembly 32 and over an axially mounted roller 74 positioned adjacent to the drive roller 72. The intermediate layer 42 then proceeds through upper stationary mounted dancer rollers 76, lower dancer rollers 78, and guide rollers 80. The upper stationary mounted dancer rollers 76 and guide rollers 80 are axially mounted directly to the delivery assembly 32.

The delivery assembly 32 further comprises an adjustment system for balancing the tension of the intermediate layer 42 through the rollers 76, 78 and 80. The adjustment system comprises a pivoting arm 82. The lower dancer rollers 78 are operatively coupled to the distal end of the arm 82. The arm 82 is pivotally coupled to the delivery assembly 32 at an axis 84 and pivots between first and second positions in response to tension of the intermediate layer 42 engaged by the dancer rollers 76, 78. The arm 82 is lowered into the first position and raised into the second position. The lower dancer rollers 78 are displaced from the axis 84. As shown in FIG. 5, the adjustment system further comprises a second arm 86 pivotally coupled to the back side of the delivery assembly 32 at the axis 84. The arm 86 is rigid in respect to arm 82 on the front side of the delivery. A weight 88 is attached to the distal end of the arm 86 and a cam 90 is attached at the proximal end of the arm 86. The weight 88 on arm 86 is adjustable along the length of the arm 36 to assist in balancing the tension of the intermediate layer 42 between the first and second positions. The cam 90 is rigid with respect to the arms 82, 86 and is rotatable with the arms 82, 86. The cam 90 has a cam surface defined about the axis 84 with an eccentric portion 92 and a radius varying continuously relative to the axis 84 between a longer first radius r and a shorter second radius r2. The first and second radiuses r, r2 substantially correspond with the first and second positions of the arm 82 respectively.

The tension upon the intermediate layer 42 may be adjusted by increasing or decreasing the speed of the motorized roller 72 in response to movement of the cam 90. The cam 90 rotates as the arm 82 moves between the first and second positions. A proximity sensing device 96, fixed to the delivery assembly and directed at the eccentric portion 92 of the cam 90, measures the distance from the cam 90. The distance from the cam 90 changes as the cam rotates about the axis 84. The larger the radius of the cam 90, for example r1, at the point where the proximity sensing device is directed, the closer the cam 90 is to the proximity sensing device 96. The proximity of the cam 90 to the sensing device 96 is used to indicate whether the motorized roller 72 is to speed up or slow down in order to decrease or increase the tension of the intermediate layer 42 between the rollers 76, 78. Proximity sensing devices 96 are available from Turck, Inc., of Minneapolis, Minn., USA, and are referred to as Model Number N18-M18-LU.

When too much slack is present between the rollers 76, 78, and consequently in the applicator assembly 34, the rollers 78 drop and the arm 82 falls into the position because of the weight 88 on arm 86. To increase tension, the sensing device 96 senses that the cam 90 has rotated towards r1, the arm 82 having moved toward the first position, and the motorized roller 72 slows down to decrease the amount of intermediate layer 42 dispensed from the unwind roll 64.

On the other hand, to decrease tension, the sensing device 96 senses that the cam has rotated towards r2, indicating the arm 82 has moved into the second position, and the motorized roller 72 speeds up to dispense more of the intermediate layer 42 from the unwind roll 64. When the intermediate layer 42 is too taut in the rollers 76, 78, the arm 86 with weight 88 is raised.

Figure 7:
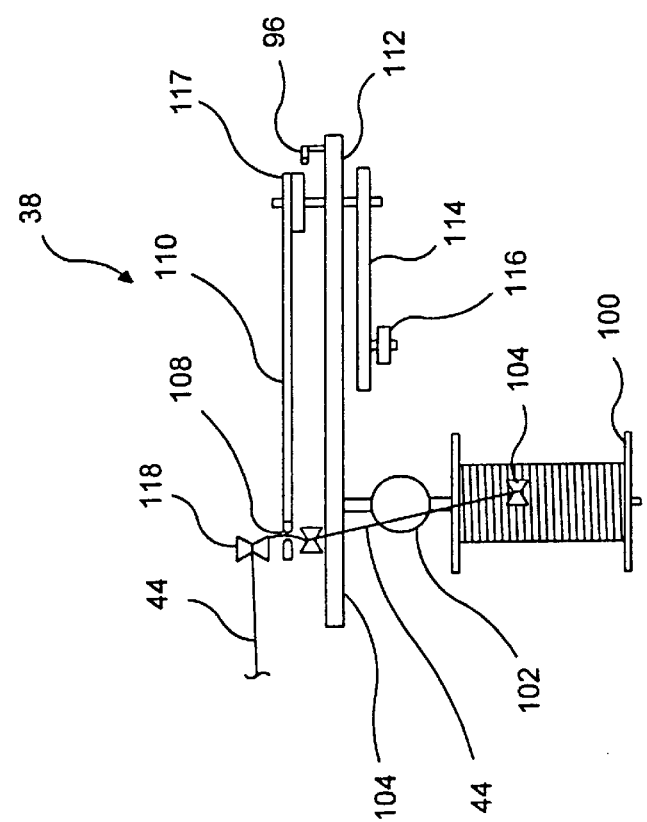
FIG. 7 is a top view of the profile unwind assembly taken along line 6-6 of FIG. 6.
Figure 6:
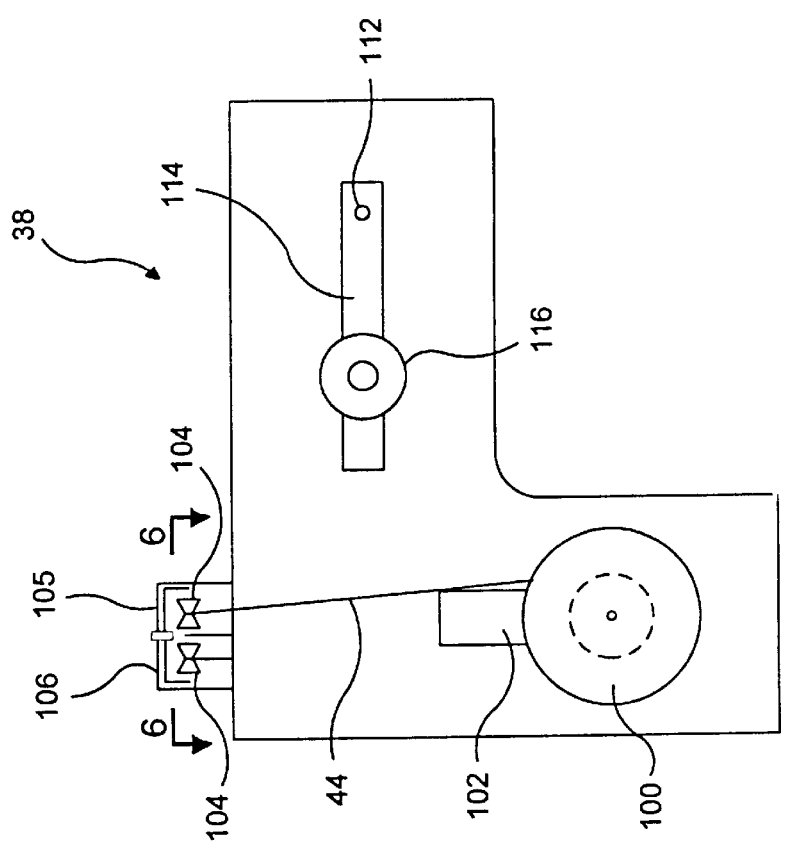
FIG. 6 is a front side view of profile fastener being unwound and passing over the top of the profile unwind assembly.

FIG. 5 also illustrates a motorized unwind roll 100 of profile fastener 44 which is axially mounted to the profile unwind assembly 38. FIGS. 6–8 best illustrate the profile unwind assembly 38. A motor 102 drives the unwind roll 100 which varies the rate of speed at which the profile fastener 44 is being unwound from the unwind roll 100. As shown in FIG. 6, profile 44 is unwound from the roll 100 and passes over the top of profile unwind assembly 38 with the aide of a pair of guide rollers 104. The guide rollers 104 are suspended by cantilever members 105 and 106 which are best shown in FIG. 6. The guide roller suspended on cantilever 105 receives the profile fastener 44 from the unwind roll 100. The profile fastener 44 then proceeds over to the guide roller 104 supported on cantilever 106. The profile fastener then proceeds to a roller 108 supported on an arm 110 pivotally mounted on the profile unwind assembly 38 at an axis 112. The arm 110 pivots between first and second positions in response to the tension of the profile fastener 44 in a manner similar to that of the intermediate layer 42 in the delivery assembly 32.

A second pivoting arm 114 is coupled to the axis 112 on the opposite side of the profile assembly 38 having the arm 110. The arms 110 and 114 are rigid with respect to one another. A weight 116 is attached to the distal end of arm 114 as shown in FIG. 6. The weight 116 is adjustable along the length of arm 114 for balancing the tension of the profile fastener 44. A cam 117 is coupled to the proximal end of arm 110 as shown in FIGS. 7 and 8. As the arm 110 pivots, a second proximity device 96, fixed to the profile unwind assembly 38, measures the distance from the cam 117. As the cam rotates in response to the changing tension of the profile fastener 44 and the pivoting of arm 110, the distance between the proximity sensing device 96 and the cam 117 changes. The motor 102 speeds up or slows down in order to decrease or increase the tension of the profile fastener 44 being delivered to the applicator assembly 34. Once the profile 44 leaves roller 108, the profile 44 proceeds to roller 118 which redirects the profile towards the applicator assembly 34. The profile unwind assembly 38 preferably provides the profile 44 to the applicator assembly at approximately 80 feet per minute. The rate of delivery of the intermediate layer 42 and the profile fastener 44 should be approximately the same.

FIGS. 4 and 9 illustrate a panel member 120 having a generally V-shaped configuration defined by an upper surface 122 and first and second convergent edges 124 and 126 respectively. The convergent edges 124, 126 converge towards an apex 128 at the posterior end of the V-shaped panel member 120. The V-shaped panel member 120 is adjustably mounted to the delivery assembly 32 by a mount 130 such that the upper surface 122 is declined. The intermediate layer 42 passes over the upper surface 122 and the convergent edges to define the fold 51 and a fold line 132 at the apex 128. As the intermediate layer 42 passes over the apex 128, the intermediate layer 42 changes directions relative to the direction of the intermediate layer 42 over the upper surface 122. As best shown in FIG. 9, the intermediate layer 42 then passes under a guide roller 140 to fold the intermediate layer 42 onto itself at the fold line 132. The fold line 132 divides the intermediate layer, lengthwise, into two separate continuous strips generally referred to as flanges 52,54. The guide roller 140 and the V-shaped panel member 120 are spaced apart in a fixed angular relationship as best shown in FIG. 4.

The intermediate layer 42 may be offset to one side of the V-shaped panel member 120 while passing over the upper surface 122 in order to control the width of each flange. The positioning of the intermediate layer upon the V-shaped panel member 120 is controlled by altering the alignment mechanism of roll 64. For example, if the intermediate layer 42 is offset 0.5 inches to either side, one of the flanges will be 1.0 inches wider from the fold line 132 than the other.

FIG. 9 also illustrates the profile 44 being inserted between the upper and lower flanges 52, 54 of the intermediate layer 42. A substantially horizontal oriented planar member, generally referred to as a profile insertion assembly 142, is mounted to the applicator assembly 34 with a bracket 144. The profile insertion assembly 142 has a channel 146 for receiving the profile 44. The channel 146 directs the profile 44 between the upper and lower flanges 52, 54. The profile insertion assembly 142 further includes a passage 148 for receiving the profile 44 which intersects with the channel 146 at preferably a 90 degree angle. A ball bearing (not shown) is located at the point of intersection to reduce friction between the profile 44 and the profile insertion assembly 142. Die passage 148 redirects the profile 44 from the channel 146 into the machine direction of the intermediate layer 42 and positions the profile 44 substantially parallel with and at a predetermined distance from the fold line 132. Preferably, the profile 44 is laterally displaced from the fold line 132 after exiting the passage 148 by approximately 1.25 inches.

Figure 10:
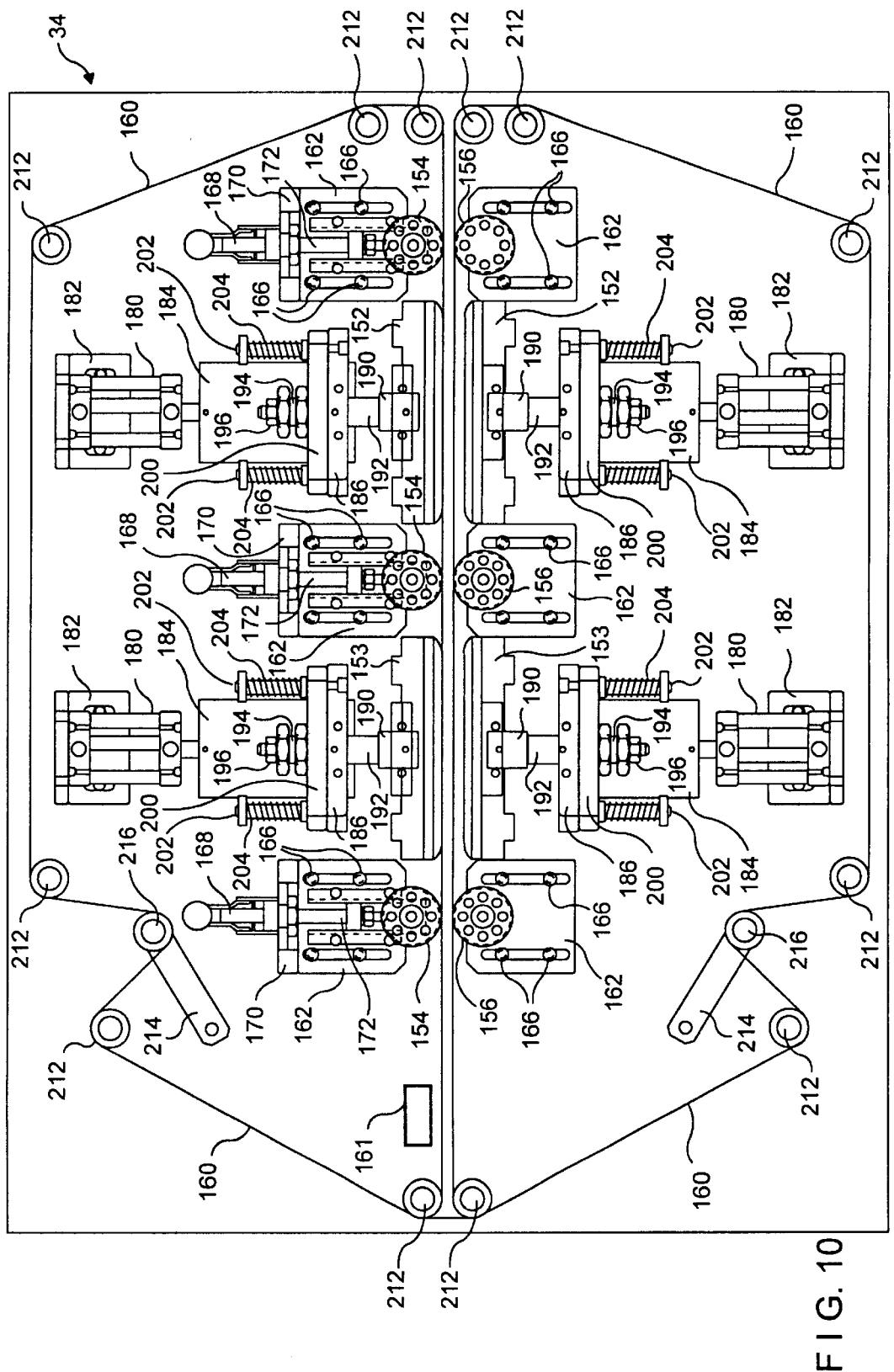
FIG. 10 illustrates the applicator assembly of the present invention having two pairs of sealing bars, wheels and a pair of drive belts for sealing the profile to the intermediate layer.

FIG. 10 illustrates the applicator assembly 34 of the present invention. As shown in FIG. 10, the applicator assembly 34 includes two pairs 152, 153 of vertically opposed elongated seal bars. The first pair of sealing bars 152 is used to seal the profile fastener 44 to the intermediate layer and the second pair of sealing bars 153 is used to create the peel seal. The sealing bars are preferably 6 inch elongated portions of machined ductile iron with a coated finish called magnaplating. Because the pairs of seal bars 152, 153 will seal different portions of the intermediate layer, they are offset with respect to each other.

The applicator assembly 34 further comprises a plurality of upper and lower rotating wheels 154 and 156, respectively, supported on the applicator assembly 34. The upper wheels 154 oppose lower wheels 156. The wheels 154, 156 are unique in that each includes a circumferential grove 158 sized for receiving the profile 44 therein when the wheel 154, 156 is pressed against the profile 44 and the intermediate layer 42. A pair of belts 160 are also positioned between the wheels 154, 156 and the profile 44. Thus, the wheels 154, 156 do not actually contact the intermediate layer 42 or profile 44.

As indicated above, the applicator assembly 34 further comprises the pair of belts 160 spanning over a plurality of rollers 212. The belts 160 are preferably Teflon coated fabric belts. As shown in FIG. 10, lengths of each of the universal belts 160 abut one another. The intermediate layer 42, profile 44 and belts 160 proceed between the wheels 154, 156 and the sealing bars 152.

The rollers 212 axially extend from the applicator assembly 34 and are displaced from one another. For each belt 160 there is a tensioning arm 214 and roller 216. The rollers 216 axially extend from the distal end of the tensioning arms 214. The proximal ends of the tensioning arms 214 are pivotally mounted to the applicator assembly 34. The tensioning arms 214 are spring loaded so that the tension of each belt is automatically maintained by the tensioning arms 214 as the belts become worn.

During operation of the applicator assembly 34, the folded intermediate layer 42, with the profile 44 between the flanges 52,54 of the intermediate layer 42, are provided to the sealing, bars 152, 153 by the rotation of the belts 160 about rollers 212, 216. The grooves 158 of the wheels 154, 156 capture the profile 44 and properly align the profile 44 for engagement with the sealing surface 206. The sealing bars 152, 153 seal the profile 44 to the intermediate layer 42 and create the peel seal without actually touching the intermediate layer 42 or the profile 44 because the belts 160 are positioned between the sealing bars 152, 153 and the intermediate layer 42 and the profile 44.

Each pair of sealing bars 152, 153 is heated in order to thermally seal the profile fastener 44 to the intermediate layer 42 and to create the peel seal. While the peel seal may be placed on either side of the profile fastener, as discussed below, the peel seal is preferably placed on the side of the profile fastener which will correspond to the consumer side of the reclosable plastic bag in which it will be used.

With respect to the sealing bars 152 used to seal the profile fastener 44 to the intermediate layer 42, the sealing bars 152 are heated to a temperature in the range of 500–600° F. The sealing bars 152 are moveable with respect to each other from a spaced clearance position into a clamping and sealing position in relation to the intermediate layer 42 and the profile 44 therebetween. While in the sealing and clamping position, there is preferably a gap of approximately 0.057 inches between the opposed sealing bars when heated to operating temperatures. The profile 44 is secured to the intermediate layer 42 when the sealing bars 152 are in the clamping and sealing position. The sealing bars 152 never actually contact the intermediate layer 42 or the profile fastener 44 because of the belts 160.

With respect to the sealing bars 153 used to create the peel seal, they are heated to a temperature of in the range of 240–300° F. Additionally, a manifold 161 is configured to blow ambient air on the belts in order to bring the belt temperature from approximately 180° F. after the sealing stations to approximately 85–100° F. as the belts enter the sealing stations. During sealing, the sealing bars 153 clamp down on the opposing non-coated portions 60, 62 of the intermediate layer 42 (with the belts 160 between the bars and the intermediate layer). As discussed above, the narrow heat window which is created, coupled with the layered structure of the intermediate layer 42 ($\leq$4% EVA/HDPE/$\leq$4% EVA), results in the formation of a consistent peel seal 63 between the opposing non-coated portions 60, 62 of the intermediate layer 42. The surfaces of the sealing bars 153 are configured to provide a narrow peel seal.

In the preferred embodiment of the present invention, once the profile 44 has been sealed to the intermediate layer 42 and the peel seal formed to form the fastener tape 40, the fastener tape 40 proceeds to a pair of cooling blocks. The cooling blocks prevent the fastener tape 40 from becoming deformed from extended exposure to heat. Compressed air is provided at approximately 100 pounds per square inch through air lines to the cooling blocks in order to cool the fastener tape 40 after having undergone the sealing processes. Preferably, the cold air should be at least cooler than ambient air. Most preferably, the temperature of the cold air should approach approximately 0° F. The cold air is directed downward on to the fastener tape 40. Cooling blocks are available from I.T.W. Vortex, Cincinnati, Ohio. An alternative to the cooling blocks would be to route the fastener tape 40 through chilled rollers to dissipate heat.

In the preferred embodiment, as the fastener tape 40 proceeds from the cooling blocks a sharpened blade, aligned parallel with the machine direction of the fastener tape 40, is positioned to contact and cut the intermediate layer 42 at the fold line 132 and divide the portion of the intermediate layer treated with the non-sealable barrier 50 into two separate continuous portions. Once the intermediate layer 42 has been cut along the fold line 132, the intermediate layer 42 becomes two separate continuous portions joined together by the continuous profile 44, as show in FIGS. 11 and 12.

The fabricated fastener tape 40 proceeds from the cooling blocks and the applicator assembly 34 to the tape collection assembly 36, where it is wound up on a powered wind up roll.

As discussed above, the peel seal 63 may be placed above the profile fastener (consumer side) as shown in FIG. 11, or below the profile fastener (contents side) as shown in FIG. 12. In the preferred embodiment, the peel seal 63 is placed above the profile fastener 44 since it is difficult to obtain a hermetic seal with the peel seal below the profile fastener 44.

As shown in FIGS. 11 and 12, the resulting fastener tape 40 includes a profile fastener 44, upper and lower flanges 52, 54, a lip 236, an opposite wall 238 and a peel seal 63.

The faster tape 40 of the present invention, fabricated in accordance with the above identified apparatus and process, may be utilized in the manufacture of plastic bags by attaching the fastener tape 40 to form the plastic bag 58 as shown in FIGS. 13 and 14. The process and apparatus for attaching fastener tape to fabricate a reclosable plastic bag are described in greater detail in copending U.S. Patent Application having U.S. Ser. No. 08/899,434 filed on Jul. 24, 1997, and entitled "Fastener Tape Material, Bag Utilizing Fastener Tape Material, and Method of Manufacture Thereof", the entire disclosure of which is incorporated herein by reference.

As shown in FIGS. 13 and 14, to form the reclosable plastic bag 58, the fastener tape 40 is attached to a base material 258. The fastener tape 40 is attached to the base material 258 by sealing the lower flange 54, lip 236 and opposite wall 238 to the base material 258. The seals between the base material 258 and the lower flange 54, lip 236 and opposite wall 238 are generally designated as the reference numeral 250. The seals 250 are made in accordance with the disclosure contained within the above-identified incorporated reference. Note, however, that the upper flange 52 is not sealed to the base material 258. Therefore, flange 52 is not required to be as wide as flange 54. The non-sealable coating 50 prevents the lip 236 from being sealed to the opposite wall 238. The reclosable bag 58 also includes top and bottom seals 268.

The peel seal 63 is primarily intended as an additional barrier against contaminants when the bag also includes a tear strip 260 formed by a row of perforations 262 along the top of the plastic bag 58. The product in the bag 58 determines whether the bag 58 has a tear strip 260. The peel seal 63 of the plastic bag 58 hermetically seals in the contents of the bag until the consumer opens the plastic bag 58 from the top. The perforations 262 should be laterally displaced above the peel seal and profile 44. The consumer simply tears away the tear strip 260 along the row of perforations 262 and pulls apart the peel seal and the profile to gain access to the plastic bag 58.

Additionally, the fastener tape 40 includes side, or block, seals 264 which seal the lip 236 and opposing wall 238 to each other at the ends of the fastener tape immediately above the profile fastener 44. The block seals 264 also extend into the peel seal 63, gaining hermeticity. As discussed above, the block seals 264 eliminate the need to stomp the ends of the profile fastener 44, resulting in great cost savings.

The block seals 264 may be added to the fastener tape 40 before the bag is made (presealing) or, as shown in FIG. 13, may be made during manufacture of the plastic bag 58. In the latter case, the block seals 264 also seal the side folds 270 of the plastic bag together and can be made by the same seal bars which seal the fastener tape to the base material 258.

In the preferred embodiment, the peel seal 63 and block seals 264 are placed above the profile fastener 44, although they can be placed below. There is approximately 3/8" of intermediate layer 42 above the profile fastener 44 that is uncoated and sealable, with the peel seal 63 being placed approximately 1/4" above the profile fastener 44. The block seals 264 merge with the peel seal 63 and discontinue approximately 1/8" above the profile fastener 44.

As discussed above, to open the bag 58 the user simply tears the top seal off and opens the bag by pulling with opposite forces against the peel seal and the profile lock, using the perforations as a guide for the tear.

The present invention has been illustrated in great detail by the above specific examples. It is to be understood that these examples are illustrative embodiments and that this invention is not to be limited by any of the examples or details in the description. Those skilled in the art will recognize that the present invention is capable of many modifications and variations without departing from the scope of the invention. Accordingly, the detailed description and examples are meant to be illustrative and are not meant to limit in any manner the scope of the invention as set forth in the following claims. Rather, the claims appended hereto are to be construed broadly within the scope and spirit of the invention.

We claim:

1. A fastener tape to be mounted in an opening of a reclosable bag having opposing walls, said fastener tape comprising:

an intermediate layer having opposite longitudinal edges and upper and lower surfaces, said intermediate layer including three vertical layers of co-extruded plastic, the upper and lower layers being formed from not more than 4% ethyl vinyl acetate (EVA) and the middle layer being formed from high density polyethylene (HDPE); and a releasable interlocking profile fastener on said intermediate layer, said profile fastener being substantially coextensive with and laterally spaced from said edges.

2. The fastener tape according to claim 1 further including an elongated non-sealable barrier on one of said surfaces substantially coextensive with and laterally spaced from said edges and said profile fastener.

3. The fastener tape according to claim 1 wherein said intermediate layer is defined by a lip, a fold connected to said lip, an opposite wall connected to said fold, and a lower flange connected to said opposite wall, said lip, opposite wall and lower flange each having an outer surface capable of being sealed to said reclosable bag.

4. The fastener tape according to claim 3 further including a peel seal between said lip and said opposite wall.

5. The fastener tape according to claim 3 further including an upper flange connected to said lip, said upper flange being opposite said lower flange.

6. The fastener tape according to claim 5 further including a peel seal between said upper flange and said lower flange.

7. The fastener tape according to claim 3 wherein said lip is sealed to said opposite wall at the ends of said fastener tape and wherein said end seals merge with said peel seal.

8. The fastener tape according to claim 6 wherein said upper flange is sealed to said lower flange at the ends of said fastener tape and wherein said end seals merge with said peel seal.

* * * * *